(12) United States Patent
Taagepera

(10) Patent No.: US 9,636,787 B2
(45) Date of Patent: May 2, 2017

(54) NON-WELDING APPARATUS FOR REPAIR OF AN ENCLOSURE WALL AND METHODS FOR USE THEREOF

(71) Applicant: Chevron U.S.A. Inc., San Ramon, CA (US)

(72) Inventor: Jaan Taagepera, Benicia, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/613,051

(22) Filed: Feb. 3, 2015

(65) Prior Publication Data
US 2016/0221129 A1    Aug. 4, 2016

(51) Int. Cl.
*B29C 73/00*     (2006.01)
*B32B 43/00*     (2006.01)
(Continued)

(52) U.S. Cl.
CPC .............. *B23P 6/00* (2013.01); *B29C 65/48* (2013.01); *B29C 65/542* (2013.01);
(Continued)

(58) Field of Classification Search
CPC ........... Y10T 428/20; Y10T 152/10891; Y10T 152/10882; Y10T 152/109; Y10T 152/10909; B29C 73/04; B29C 73/06; B29C 73/08; B29C 73/10; B29C 73/12; B29C 65/48; B29C 65/524; B29C 65/54; B29C 65/542; B29C 65/56; B29C 65/561; B29C 65/72; B29C 66/474; F16L 55/1612; F16L 55/162; F16L 55/1645; F16L 55/16455; F16L 55/168; F16L 55/1683; B32B 2556/00

USPC ......... 156/60, 91, 92, 94, 98, 228, 242, 245, 156/292, 293, 294, 297, 298, 303.1, 305, 156/349, 381, 391, 423, 97; 138/97, 98,
(Continued)

(56) References Cited

U.S. PATENT DOCUMENTS 2,631,360 A * 3/1953 Sanford .................... B23P 6/00
29/402.11
3,236,407 A * 2/1966 Zelman .................... B23P 6/04
138/99

(Continued)

FOREIGN PATENT DOCUMENTS

JP    07119885 A    5/1995
JP    09030595 A    2/1997

*Primary Examiner* — Philip Tucker
*Assistant Examiner* — Brian R Slawski
(74) *Attorney, Agent, or Firm* — Karen R. DiDomenicis

(57) ABSTRACT

Disclosed is a mechanical clamp useful for repairing localized damage in the wall of an enclosure such as a pressure vessel. The mechanical clamp is an apparatus having a cap having a convex side and a concave side wherein the concave side is adapted for positioning adjacent the wall of the enclosure. The apparatus further includes at least one rod attached securely in the cap for passing through at least one hole in the wall of the enclosure wherein each rod has a first end attached securely in the cap and a second end and each rod is threaded along a portion of the rod including the second end. The apparatus further includes a nut for attaching to the second end of each rod for securing the cap in place adjacent to the wall of the enclosure. Methods for applying the mechanical clamp are also disclosed.

5 Claims, 4 Drawing Sheets

(51) Int. Cl.
- *B32B 7/08* (2006.01)
- *B29C 65/00* (2006.01)
- *B32B 37/00* (2006.01)
- *C09J 5/00* (2006.01)
- *F16L 55/16* (2006.01)
- *B23P 6/00* (2006.01)
- *B29C 65/72* (2006.01)
- *B29C 65/48* (2006.01)
- *B29C 65/54* (2006.01)
- *B29C 65/56* (2006.01)
- *F16L 55/1645* (2006.01)
- *B29C 73/10* (2006.01)
- *B29C 73/06* (2006.01)

(52) U.S. Cl.
CPC ............ *B29C 65/561* (2013.01); *B29C 65/72* (2013.01); *B29C 66/474* (2013.01); *B29C 73/06* (2013.01); *B29C 73/10* (2013.01); *F16L 55/16455* (2013.01)

(58) Field of Classification Search
USPC ............ 138/99; 428/63; 277/312, 314, 316; 81/15.2, 15.5, 15.6, 15.7; 152/367, 368, 152/369, 370
See application file for complete search history.

(56) References Cited

U.S. PATENT DOCUMENTS

| | | | |
|---|---|---|---|
| 3,830,536 A | | 8/1974 | Frisch et al. |
| 4,079,702 A | * | 3/1978 | Furukawa ............ F22B 1/1807 122/421 |
| 4,433,828 A | | 2/1984 | Spiegelman et al. |
| 2015/0231837 A1 | * | 8/2015 | Georgeson ............ B32B 3/266 428/136 |

* cited by examiner

NON-WELDING APPARATUS FOR REPAIR OF AN ENCLOSURE WALL AND METHODS FOR USE THEREOF

FIELD

The present disclosure relates to an apparatus for repairing localized damage in a wall of an enclosure that may result in a leak, and methods for repairing localized damage in a wall of the enclosure using the apparatus.

BACKGROUND

Associated with any piece of equipment having an enclosure for containing a fluid is the possibility of localized damage in the wall of the enclosure that may result in leaking of the fluid from the enclosure. For instance, pipes and pressure vessels often contain gaseous fluid under pressure. If the wall of the pipe or pressure vessel is subject to localized damage, e.g., in the form of a small hole or pinhole, mechanical clamps are known for use as a temporary repair. FIG. 1 illustrates one such known mechanical clamp 10, also referred to interchangeably as a bolted box, a mechanical seal, a leak seal and a mechanical enclosure, as installed on a vessel wall 1. The mechanical clamp 10 shown includes a plate held in place with retainer rods and an injection valve through which sealant is applied to the vessel wall 1 in the vicinity of a leak. Such repairs are often excessively heavy as to be impractical. As can be seen from FIG. 1, internal pressure from within the enclosure tends to apply force on the repair which tends to separate the repair from the vessel and weaken the repair over time. Thus, a supplemental "strong back" device may be necessary to hold the repair in place. A superior solution as compared to the use of a strong back device can be welding the repair in place. However, welded repairs have as a disadvantage that post welding heat treatment (PWHT) of the enclosure wall is also frequently required, particularly in harsh process conditions, to decrease the risk of material degradation such as stress corrosion cracking. This heat treatment results in significant added associated time and expense and in some cases is impractical. Compounding the problem is the fact that the localized damage in the pipe or vessel wall is often in a very inconvenient location.

There exists a need for an alternative to the known vessel wall repair methods that would be more cost and time effective while still ensuring safety and reliability.

SUMMARY

In one aspect, an apparatus for repairing damage in a wall of an enclosure is provided. The apparatus includes a cap having a convex side and a concave side wherein the concave side is adapted for positioning adjacent the wall of the enclosure. The apparatus further includes a rod attached securely in the cap for passing through a hole in the wall of the enclosure wherein the rod has a first end attached securely in the cap and a second end and the rod is threaded along a portion of the rod including the second end. The apparatus further includes a nut for attaching to the second end of the rod for securing the cap in place adjacent to the wall of the enclosure.

In another aspect, a method for repairing localized damage in a wall of an enclosure having an interior and an exterior is provided. The method includes the steps of preparing a hole in the wall of the enclosure at the location of the localized damage; positioning the above-described apparatus in a desired position relative to the wall of the enclosure such that the rod of the apparatus passes through the hole in the wall of the enclosure and the concave side of the cap of the apparatus is adjacent the wall of the enclosure; and securing the apparatus in the desired position by attaching the nut to second end of the rod.

In another aspect, a method for repairing localized damage in a wall of an enclosure having an interior and an exterior is provided. The method includes the above steps, and further introducing sealant through at least one opening in the apparatus.

DESCRIPTION OF THE DRAWINGS

These and other objects, features and advantages of the present invention will become better understood with reference to the following description, appended claims and accompanying drawings where:

DETAILED DESCRIPTION

Figure 1:
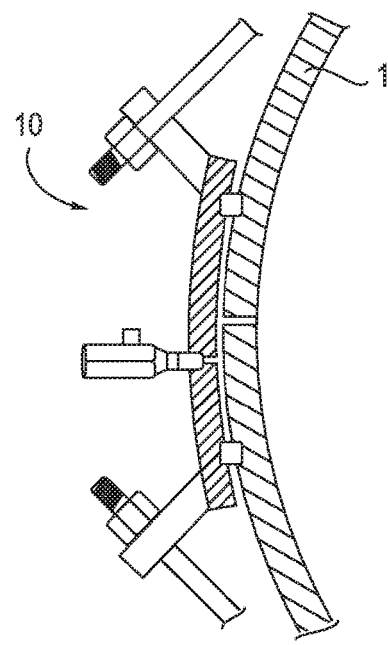
FIG. 1 is a side view of a vessel wall repair according to the prior art.

The present disclosure relates to an apparatus useful for repairing damage in a wall of an enclosure. The damage can be any localized damage that may result in a leak of the contents of the enclosure such as a hole in the wall. By localized damage is meant that the damage to the wall is within a diameter of less than 24 inches (61 cm). In one embodiment, the localized damage is a hole having a diameter less than about 4 inches (10 cm). Alternatively, the localized damage an area in a wall of an enclosure that has locally thinned but not yet developed a hole.

The enclosure can be any of several types of enclosures. In one embodiment, the enclosure is a pressure vessel. Alternatively, the enclosure can be a storage tank, a transport tank, a silo, a pipe, conduit or duct for transporting gas, liquid or multiphase fluids, a furnace, a heat exchanger or an electrostatic precipitator. The enclosure can accommodate a wide range of process conditions. For instance, pressures can range from minor external pressure of about −15 psi (i.e. full vacuum) (−103 kPa) to internal pressure of about 10,000 psi (69 MPa). Temperatures can range from cryogenic (about −300° F. (−184° C.)) to about 1200° F. (649° C.). Throughout the disclosure, the term vessel can be used interchangeably for the more general term enclosure. The enclosure has a wall which generally can have a thickness ranging between about 0.06 inches (1.5 mm) to about 8 inches (20 cm).

Figure 2:
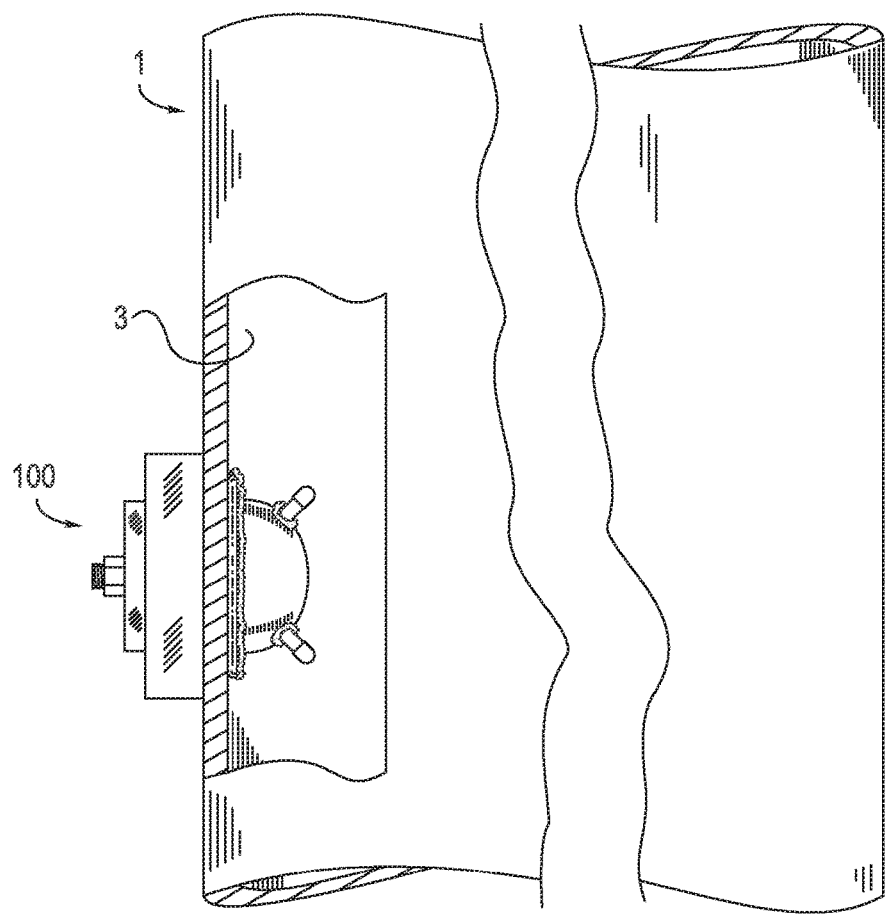
FIG. 2 is a side view of a vessel wall repair according to one embodiment.
Figure 3:
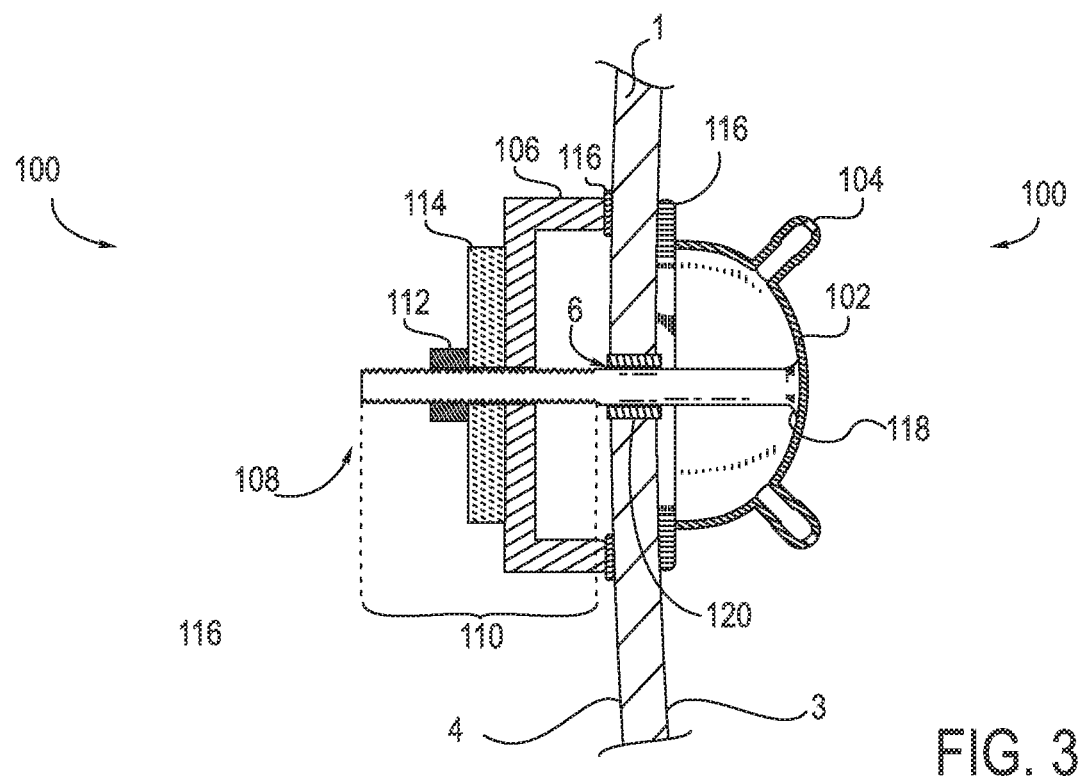
FIG. 3 is a top view of a vessel wall illustrating an apparatus for repairing damage in the vessel wall as installed.

The apparatus is also referred to herein as a mechanical clamp. Reference is made to the figures to aid in understanding the structure and function of the mechanical clamp. One embodiment of the mechanical clamp 100 as installed on an enclosure wall is illustrated in FIGS. 2 and 3. Shown in FIG. 3 is a top view of an enclosure wall 1 having an inner surface 3, an outer surface 4 and an opening 6 there through. In the embodiment illustrated, the enclosure wall 1 has a slight curvature, so that it is apparent that the inner surface 3 faces the interior of the enclosure. The apparatus 100 includes a cap 102. The cap 102 has a convex side and a concave side for positioning adjacent the enclosure wall 1. The specific shape of the cap 102 is not critical. In one embodiment, a pipe end cap fabricated according to ASME B16.9 having a 2:1 semi-elliptical shape can be used. In one embodiment, the diameter of the cap 102 can range from about 0.5 inch (1.3 cm) to about 12 inches (30 cm), and the thickness of the wall of the cap 102 can range from about 0.6 inch (1.5 cm) to about 3.0 inches (7.6 cm). In some embodiments, the cap 102 is formed with a contour to match the surface of the vessel wall 12 to which will be applied.

A threaded rod 108 is attached securely in the cap 102. In one embodiment, the rod 108 is threaded along a portion of the length thereof including the free end of the rod 108. The rod 108 can also be threaded along its entire length. The apparatus 100 further includes a nut 112 for attaching to the free end of the rod 108 for securing the cap 102 in place adjacent the enclosure wall 1. Optionally, the apparatus 100 further includes a washer 114 adjacent the nut 112. The apparatus 100 can be formed of any suitable rigid material, e.g., steel.

The rod 108 can be attached securely in the cap 102 by welding. Alternatively, a plate or nut (not shown) having a threaded opening to receive a threaded end of the rod 108 can be welded on the concave side of the cap 102.

Figure 4:
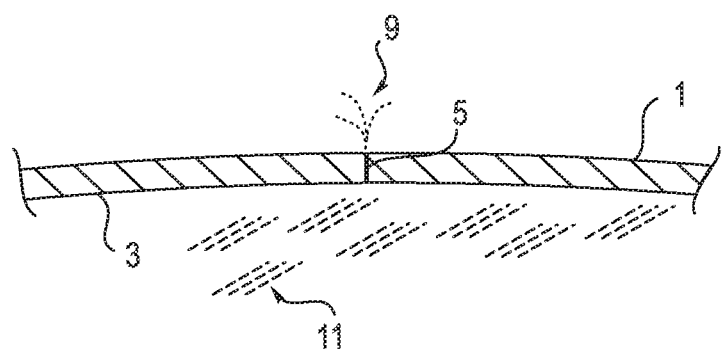
FIG. 4 is a top view of a vessel wall illustrating a leak in the vessel wall.
Figure 5:
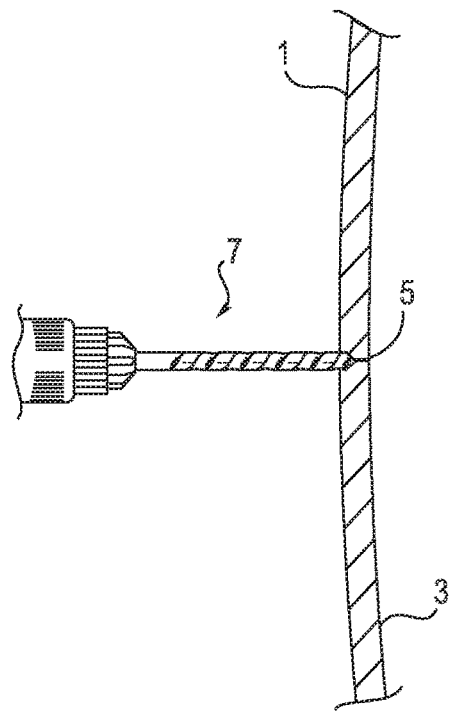
FIG. 5 is a top view of a vessel wall illustrating a method step in repairing a leak therein.

In one embodiment, a method for repairing localized damage in a wall of an enclosure is provided. As illustrated in FIG. 4, such damage can be a pinhole 5 through the vessel wall 1, resulting in a leak 9 of the vessel contents 11. In one embodiment of a method for repairing the damage, as illustrated in FIG. 5, a hole 6 is first prepared in the wall at the location of the localized damage. This can be accomplished by drilling a hole through the wall as shown in FIG. 5. Alternatively, the hole at the location of the localized damage can be punched out if the area of the localized damage has sufficiently thinned. The hole 6 needs to be sufficient in size to accommodate the diameter of the rod 108 of the apparatus 100 which will pass there through. In one embodiment, the diameter of the hole 6 can be from about ⅛ inch (3.2 mm) to about 4 inches (10 cm).

Next, after cleaning the vessel wall surface onto which the clamp will be positioned, the mechanical clamp 100 is positioned in the desired location for installation. In one embodiment, the cap 102 is positioned such that the concave side is adjacent, i.e., faces, the wall of the enclosure and the free end of the rod 108 passes through the hole 6 in the wall 1. In one embodiment, the cap 102 is positioned on the interior of the enclosure. This embodiment offers the advantage that the mechanical clamp is "self energizing," also referred to as "self pressurizing." By this is meant that the internal pressure of the enclosure actually assists in holding the mechanical clamp in place, since the internal pressure will tend to push the cap 102 against the vessel wall 1. Alternatively, the cap 102 can be positioned on the exterior of the enclosure. It can be suitable to position the cap 102 on the exterior in the case of a low pressure system such as the wall of a fired heater where space within the enclosure may be limited due to the presence of the tubes along the wall.

In order to secure the cap 102 in the desired location, the nut 112 is attached to the rod 108. An optional washer or flat plate 114 can be provided adjacent the nut 112. In one embodiment, the nut 112 can be torqued to between about 1 foot pound (1.3 N*m) and about 10,000 foot pounds (13 kN*m).

In one embodiment, the mechanical clamp 100 includes a plurality of rods 108 as described above for passing through a plurality of holes in the vessel wall 1. The number of rods 108 can vary depending on the size and the shape of the localized damage in the vessel wall. Such an embodiment is useful for applications in which the diameter of the cap 102 required to cover the localized damage exceeds a reasonable diameter which can be secured using a single rod 108. In this case, the plurality of holes in the vessel wall can be drilled to allow the rods 108 to pass through. The mechanical clamp 100 is then fabricated with rods 108 corresponding to the plurality of holes in the vessel wall.

In one embodiment, the cap 102 includes at least one optional opening 104 through which a sealant can be introduced into the apparatus. The sealant is used to provide a pressure boundary seal. Two such openings 104 are shown in FIG. 3. The opening 104 can be a threaded port. For instance, an integrally reinforced threaded branch connection can be welded in place to the cap 102, thereby providing sufficient reinforcement for the hole as well as a threaded connection to which a threaded pipe can be attached. An example of such connections is available from Bonney Forge Corporation (Mt. Union, Pa.) under the trade name Thredolet™.

Figure 6:
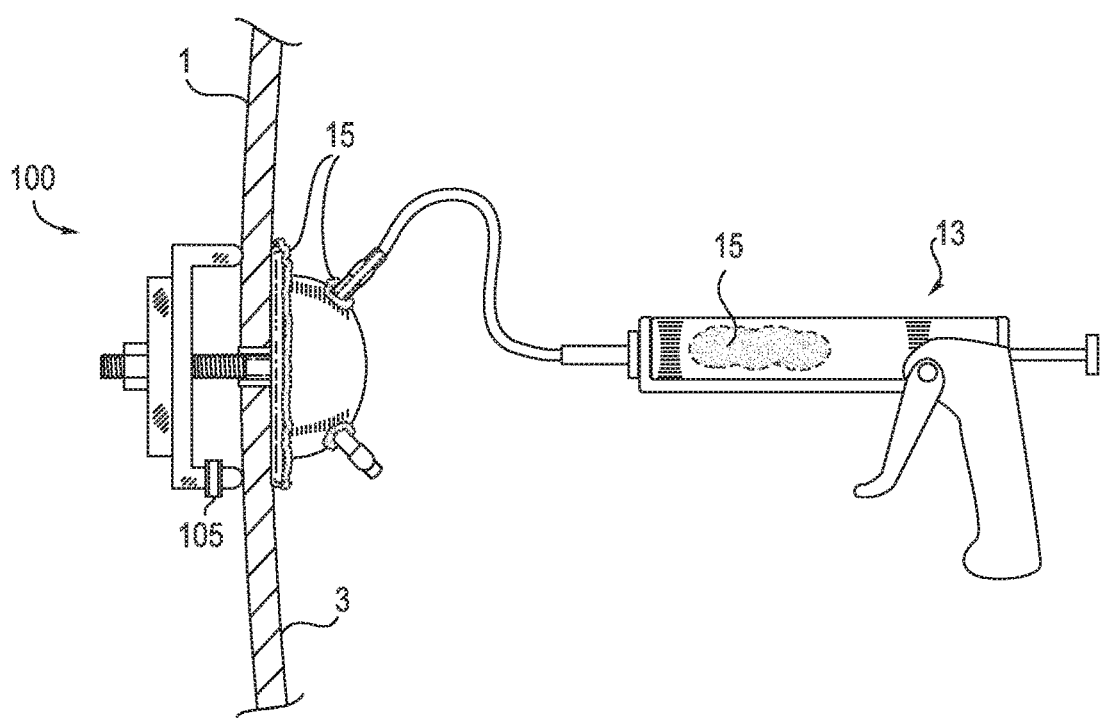
FIG. 6 is a top view of an installed apparatus for repairing damage in a vessel wall further illustrating methods for introducing sealant to the apparatus.
Figure 7:
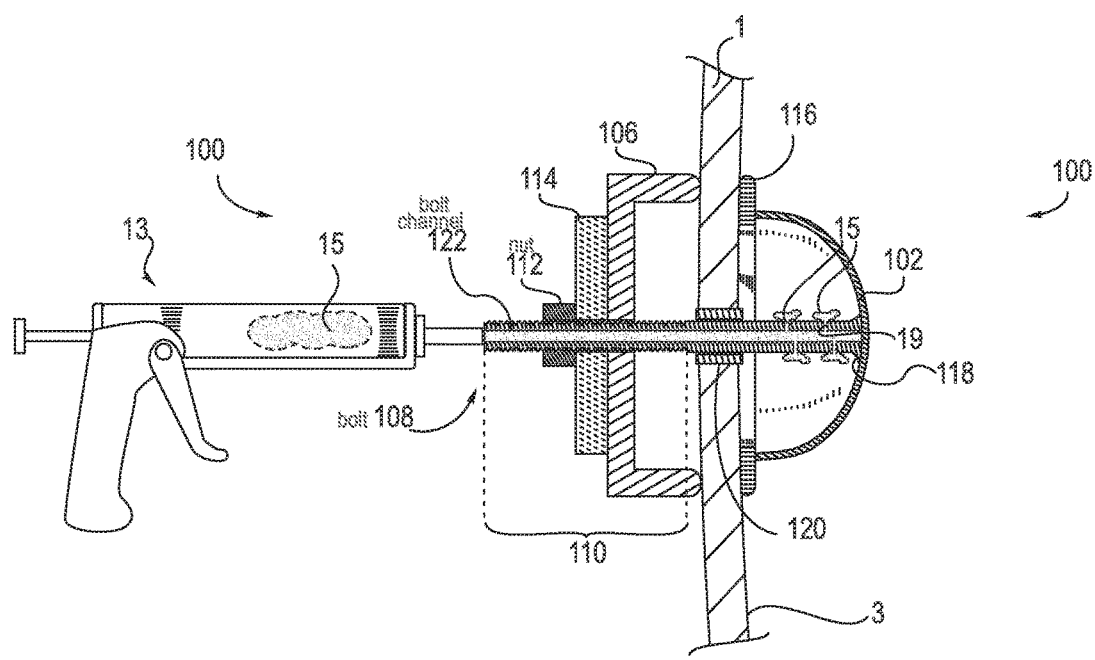
FIG. 7 is a top view of an installed apparatus for repairing damage in a vessel wall further illustrating a method for introducing sealant to the apparatus according to another embodiment.

FIG. 6 illustrates one exemplary method for introducing sealant 15 into the cap 102 via the use of a sealant gun 13. Alternatively, the sealant 15 can be poured into the opening(s) 104. The sealant can be allowed to cure for a period of time recommended by the sealant manufacturer.

In one embodiment, the apparatus 100 further includes an optional channel 106 for positioning between the wall 1 and the nut 112/optional washer 114, having an opening there through through which the rod 108 can pass. The channel 106 is provided to spread the load. By "channel" is meant any rigid structural member, including a plate, that can be placed perpendicular to the rod 108. In one embodiment, the channel 106 is a structural member having a U-shaped cross-section as shown in the top view in FIG. 3. An advantage to this shape is that it can easily accommodate a curved enclosure wall 1, since the channel 106 only makes contact with the wall 1 at two locations. Alternatively, the channel can have other cross-sectional shapes, such as I-, H- or W-shapes. In one embodiment, the channel 106 can be a C3×5 or a C3×6 structural shape, having a length between about 2 inches (5 cm) and about 36 inches (91 cm) and a hole centered on the web thereof to accommodate the rod 108. Another advantage of the shape of the channel 106 shown in FIG. 3 is that the space within the channel 106 can be filled with sealant 15 if desired as additional protection against leaks. If this is desired, the channel 106 can include at least one opening 105 through which the sealant can be introduced into the channel 106, as shown in FIG. 6.

Optional gasket material 116 can be provided for positioning between the cap 102 and the wall 1 and/or between the channel 106 and the wall 1. Optional packing material 120 can be provided between the rod 108 and the opening 6 in the wall 1. If packing material 120 is present, the rod 108 is preferably unthreaded where the packing material 120 contacts the rod 108.

Advantageously, no post weld heat treatment is required in the field, as no welding is required on the installed mechanical clamp. Any post weld heat treatment needed on the clamp can be performed on the clamp in the fabrication shop prior to installation. Post weld heat treatment temperatures can range from about 1000° F. (538° C.) to about 1500° F. (815° C.). Furthermore, no external strong backs are required to assist in resisting the pressure of the contents of the enclosure.

The mechanical clamp flexibly allows for sealing in one or more various alternative locations. These include the gasket 116 located between the cap 102 and the vessel wall 1; the gasket 116 located between the channel 106 and the vessel wall 1; the packing material 120 around the rod 108; sealant 15 that can be introduced into the cap 102 and/or into the channel 106; and combinations thereof.

It should be noted that only the components relevant to the disclosure are shown in the figures, and that other components normally part of a mechanical clamp may not be not shown for simplicity.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for repairing localized damage in a wall of an enclosure having an interior and an exterior, comprising, in order:
   a. preparing a hole in the wall of the enclosure at the location of the localized damage;
   b. providing an apparatus comprising:
      i. a cap comprising a cap wall comprising a rigid material having a convex exterior side and a concave interior side wherein the concave interior side is adapted for positioning adjacent the wall of the enclosure;
      ii. a rod having a first end fixed to the concave interior side of the cap wall without penetrating the cap wall and a second end for passing through a hole in the wall of the enclosure wherein the rod is threaded along a portion of the rod including the second end; and
      iii. a nut for attaching to the second end of the rod for securing the cap in place adjacent the wall of the enclosure; such that when the nut is attached to the second end of the rod, the secured cap is raised with respect to the wall of the enclosure; and
      iv. at least one opening in the cap for introducing sealant therein;
   c. positioning the apparatus in a desired position relative to the wall of the enclosure such that the rod of the apparatus passes through the hole in the wall of the enclosure and the concave interior side of the cap of the apparatus is adjacent the wall of the enclosure;
   d. securing the apparatus in the desired position by attaching the nut to second end of the rod; and
   e. introducing sealant through the at least one opening in the cap.

2. A method for repairing localized damage in a wall of an enclosure having an interior and an exterior, comprising, in order:
   a. preparing a hole in the wall of the enclosure at the location of the localized damage;
   b. providing an apparatus comprising:
      i. a cap comprising a cap wall comprising a rigid material having a convex exterior side and a concave interior side wherein the concave interior side is adapted for positioning adjacent the wall of the enclosure;
      ii. a rod having a first end fixed to the concave interior side of the cap wall without penetrating the cap wall and a second end for passing through a hole in the wall of the enclosure wherein the rod is threaded along a portion of the rod including the second end; and
      iii. a nut for attaching to the second end of the rod for securing the cap in place adjacent the wall of the enclosure; such that when the nut is attached to the second end of the rod, the secured cap is raised with respect to the wall of the enclosure;
      iv. a rigid structural member having a U shape or an I shape for positioning between the wall of the enclosure and the nut; and
      v. at least one opening in the rigid structural member for introducing sealant therein;
   c. positioning the apparatus in a desired position relative to the wall of the enclosure such that the rod of the apparatus passes through the hole in the wall of the enclosure and the concave interior side of the cap of the apparatus is adjacent the wall of the enclosure and the member is positioned adjacent the wall of the enclosure opposite the position of the cap;
   d. securing the apparatus in the desired position by attaching the nut to second end of the rod; and
   e. introducing sealant through the at least one opening in the member.

3. The method of claim 1 or 2, wherein the cap of the apparatus is positioned adjacent the wall of the enclosure on the interior of the enclosure.

4. The method of claim 1 or 2, wherein the cap of the apparatus is positioned adjacent the wall of the enclosure on the exterior of the enclosure.

5. The method of claim 1 or 2, wherein the enclosure is selected from the group consisting of a vessel, a pipe, a duct, a tank, a silo, a heat exchanger, and electrostatic precipitator, and a furnace.

* * * * *